US007585566B2

(12) United States Patent
Colvin et al.

(10) Patent No.: US 7,585,566 B2
(45) Date of Patent: Sep. 8, 2009

(54) RESIN IMPREGNATED SUBSTRATE MATERIALS

(75) Inventors: John C. Colvin, The Woodlands, TX (US); Charles Vignal, The Woodlands, TX (US); Philippe Edouard Tissot, Corpus Christi, TX (US); Larry Raymond Crowe, Conroe, TX (US)

(73) Assignee: Houston Advanced Research Center, The Woodlands, TX (US)

( * ) Notice: Subject to any disclaimer, the term of this patent is extended or adjusted under 35 U.S.C. 154(b) by 372 days.

(21) Appl. No.: 11/095,901

(22) Filed: Mar. 30, 2005

(65) Prior Publication Data

US 2005/0171313 A1 Aug. 4, 2005

Related U.S. Application Data

(60) Continuation of application No. 10/618,499, filed on Jul. 11, 2003, now abandoned, which is a division of application No. 09/781,560, filed on Feb. 13, 2001, now Pat. No. 6,620,459, and a continuation-in-part of application No. 09/781,560.

(51) Int. Cl.
*B32B 27/00* (2006.01)

(52) U.S. Cl. .............. 428/423.1; 428/425.1; 428/537.1; 428/537.5; 428/541

(58) Field of Classification Search .............. 428/423.1, 428/425.1, 537.1, 537.5, 541
See application file for complete search history.

(56) References Cited

U.S. PATENT DOCUMENTS 3,870,665 A * 3/1975 Diehr et al. .................... 524/9

FOREIGN PATENT DOCUMENTS

| | | |
|---|---|---|
| JP | 02-061204 | 3/1990 |
| JP | 06-099410 | 4/1994 |
| JP | H6-182714 | 7/1994 |
| JP | 10-323809 | 12/1998 |
| JP | 200-271910 | 10/2000 |

OTHER PUBLICATIONS

English Translation of Japanese Unexamined Patent Application H6-182714; publication date Jul. 5, 1994; 8-pgs.
Computer generated translation of JP 2000-271910, obtained from Japan Patent Office at http://www.ipdl.inpit.go.jp/.

* cited by examiner

*Primary Examiner*—Thao Tran
(74) *Attorney, Agent, or Firm*—Wong, Cabello, Lutsch, Rutherford & Brucculeri LLP

(57) ABSTRACT

Building materials based on polyisocyanate-impregnated lignocellulosic substrates provide increased strength and water, fire, insect, and fungi resistance compared to prior art building materials. At the same time, such building materials exhibit an aesthetically pleasing surface and can, therefore, be used in consumer visible applications (such as furniture) as well as in consumer invisible (such as door frames and stiles) applications.

28 Claims, 2 Drawing Sheets

RESIN IMPREGNATED SUBSTRATE MATERIALS

CROSS-REFERENCE TO RELATED APPLICATIONS

This application is a continuation of U.S. patent application Ser. No. 10/618,499 filed Jul. 11 2003, which has been abandoned and is incorporated herein by reference and which claims priority (as a Divisional and Continuation-in-Part) to U.S. application Ser. No. 09/781,560 (filed 13 Feb. 2001) that issued as U.S. Pat. No. 6,620,459 on 16 Sep. 2003, entitled "Resin-Impregnated Substrate, Method of Manufacture and System therefor" by J. Colvin et al.

BACKGROUND

The disclosed invention relates to polyisocyanate-impregnated lignocellulosic substrates. More particularly, the invention is a polyisocyanate-impregnated lignocellulosic substrate that is able to withstand moisture and displays a resistance to fungus and insects. The polymerized substrate may be used for doors, door parts and the like.

Hollow core doors are used principally in interior applications. A hollow core door may be a flush door, that is one flat or planar, with or without molded surfaces, on both major surfaces. The skins used for flush doors are relatively inexpensive, but they do not provide the aesthetic features and physical properties sometimes required by consumers. Hollow core doors manufactured from medium and high density fiberboard skins are not typically used in exterior applications, due to problems associated with moisture absorption and the resultant swelling of the cellulosic fibers.

Many hollow core doors are made from door skins, rails and stiles formed from wood and/or composite materials. These wood composite materials may include particle board, flake board, hard board and medium density fiber board ("MDF"). The wood composites utilize a resin binder, which is frequently a thermal setting resin, in order to maintain the wood fibers forming the composite in solid form. The wood composites are not moisture impervious, so doors utilizing such composites may not be suitable for exterior applications. Should the composite material absorb moisture, whether in liquid or gas form, the door components may swell and the door become distorted. Fiberglass and steel doors do not have the same moisture absorbing tendency, and hence are more frequently used for exterior applications.

The use of urea-formaldehyde or phenol-formaldehyde resins as binder material in wood composites is also known in the art. After polymerization of impregnated wood composites as described above, these resins tend to strengthen composite door materials by forming a three-dimensional cross-linked structure in and around the wood fibers. However, they do not form chemical bonds to the cellulose molecules of the lignocellulosic fibers, but instead they merely encapsulate the wood fibers in a physical net of cross-linked resin. Generally speaking, physical bonds, such as those just described, are much weaker than chemical bonds. Phenol-formaldehyde binder is additionally unsatisfactory because its cross-linking reaction proceeds at a relatively slow rate and requires a temperature in excess of 350° F.

Resin-impregnated substrates have in the past been disclosed but their manufacture has been undesirable because they required the use of a solvent or vapor recovery system, long cure times, and relatively high manufacturing costs due to oven curing. These efforts involving dry curing or curing that does not take place by application of a heated liquid, have also resulted in a surface appearance that is too glossy, cracked, marred, and/or is otherwise aesthetically displeasing. First, both fine and coarse, broken or unbroken bubbles are formed on the surface due to $CO_2$ escaping through a film of resin formed on the substrate surface, resulting in a rough, pitted and generally marred appearance. Second, the surface film of cured resin cures to a high gloss finish. Third, the resin film tends to pool and run before curing is completed, resulting in streaks, runs, and drips on the substrate surface.

Attempts to remove the high gloss, rough, pitted and marred surface film from the polyisocyanate-impregnated substrate have been unsuccessful because such efforts leave a rough, matte, highly textured surface having a wholly unsuitable aesthetic appearance. Additionally, if the substrates are molded or otherwise configured into a three dimensional pattern before impregnation, as is done for molded door skins, the three dimensional design or pattern on the cured, impregnated substrate is ruined if the oven-cured surface film is removed. This is because the fine details, lines, curves, ridges, and other three dimensional patterns are scraped, sanded, gouged, or otherwise worn down and marred as the surface film is removed.

Those skilled in the art will recognize that there is a need for a polyisocyanate-impregnated lignocellulosic substrate exhibiting suitable strength and water resistance so that it may be used for exterior applications. Yet a further need in the art is a method of manufacturing such polyisocyanate-impregnated lignocellulosic substrates, but without requiring expensive oven curing or additional surface processing. The disclosed invention meets these and other needs in the art.

SUMMARY

In one embodiment the invention provides building materials based on polyisocyanate-impregnated lignocellulosic substrates that provide increased strength and water, fire, insect, and fungi resistance compared to prior art building materials. At the same time, building materials in accordance with the invention exhibit an aesthetically pleasing (e.g., non-glossy, smooth, and satin-like) surface and can, therefore, be used in consumer-visible applications such as furniture as well as in consumer-invisible, such as door frames and sub-floors. applications.

DETAILED DESCRIPTION

The inventors have found that polymerizing an isocyanate resin-impregnated lignocellulosic substrate by applying a heated liquid to it, the product obtained not only has increased strength, water resistance, rot resistance, and termite resistance, as compared to the prior art, but it also has a smooth, relatively non-glossy, satin-like finish. The inventors have further found that by passing the isocyanate resin-impregnated lignocellulosic substrate through an air knife system, the resin may be impregnated more deeply and uniformly into the lignocellulosic substrate, while at the same time removing excess resin from the surface of the substrate.

The lignocellulosic substrate used to produce the inventive article is made of lignocellulosic material, i.e., material containing both cellulose and lignin. Often, such lignocellulosic material is in a fibrous form. Suitable lignocellulosic materials include wood particles, wood fibers, straw, hemp, sisal, cotton stalk, wheat, bamboo, jute, salt water reeds, palm fronds, flax, groundnut shells, hard woods, or soft woods, as well as fiberboards such as high density fiberboard, medium density fiberboard (MDF), oriented strand board and particle board. Although wheat straw and other bodies of annual plants contain some lignin they are sometimes not referred to as lignocellulosic materials. However, for purposes of the present invention these annual plants are included within the term "lignocellulosic material." The lignocellulosic substrate is preferably medium density or high density fiberboard.

The lignocellulosic substrate may be molded or non-molded, and may be in the form of a strip, panel, block, sheet, veneer or the like. The lignocellulosic substrate is preferably suitable for use as a door or door component, including skins, cores, stiles, rails, moldings and the like. It will be obvious to those of ordinary skill in the art, that impregnated lignocellulosic substrate in accordance with the invention may also be used in floors, signage, outdoor recreational equipment, furniture, and other building components.

Figure 1:
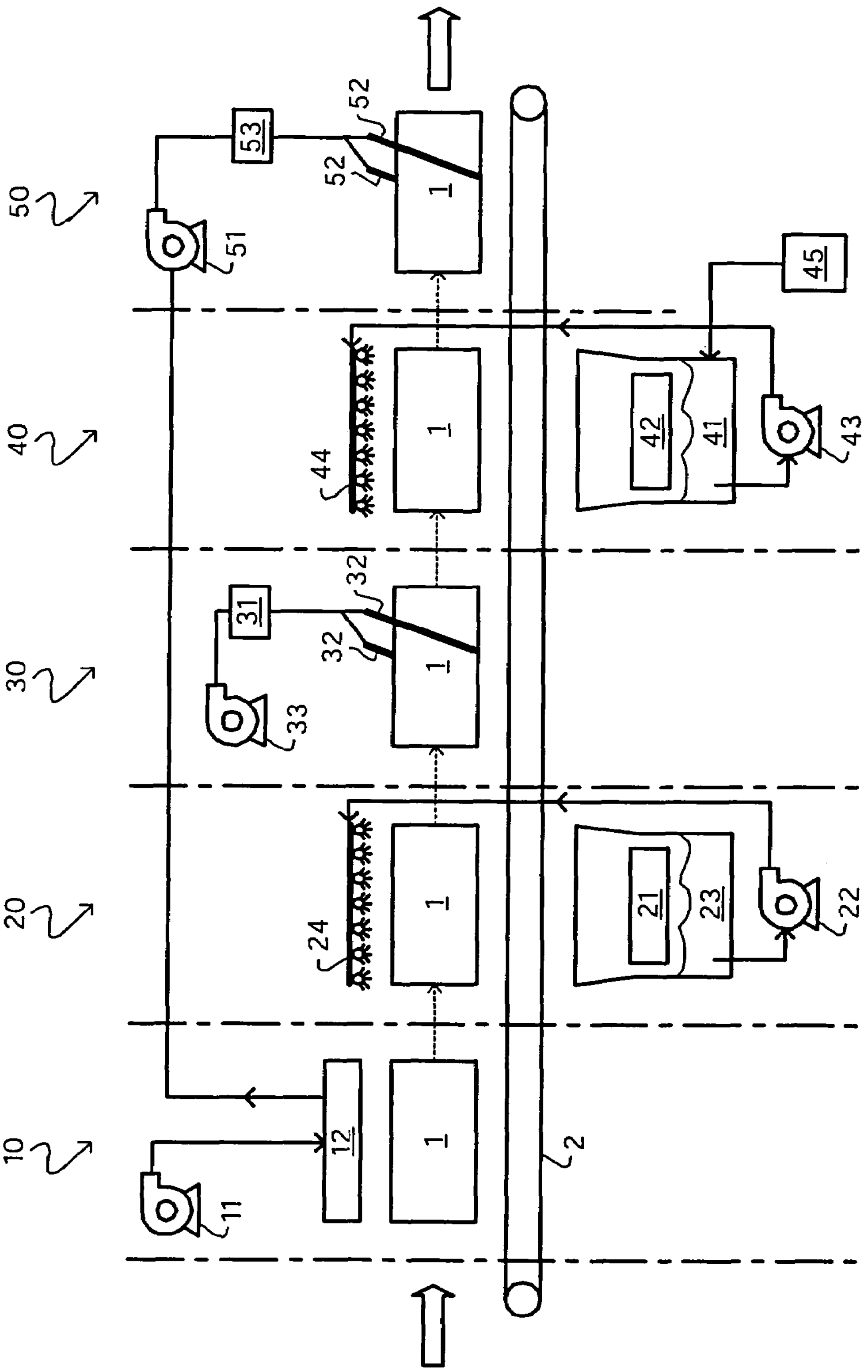
FIG. 1 is schematic view of a system in accordance with the present invention.

As best shown in FIG. 1, the lignocellulosic substrate is dried at a dehydration station 10. Ordinarily, stock lignocellulosic substrates have a moisture content of about 3-8% by weight, but an even lower moisture content is important for achieving maximum strength and penetration by the isocyanate resin material. When methylene diphenyl diisocyanate (MDI) is used as the isocyanate resin material, water in the lignocellulosic material tends to react with the MDI to form a urea linkage. This urea linkage is weaker than that of the urethane linkage between the cellulose molecules and the polyisocyanate obtained after polymerizing the isocyanate resin material, thus it reduces the overall potential strength of the final product, as compared to a drier substrate treated according to the method. For each gram of water removed from lignocellulosic substrate 1, approximately one gram of isocyanate resin will replace it in the polyisocyanate-impregnated lignocellulosic substrate. Preferably. the dehydration step results in lignocellulosic substrate 1 with a moisture content of less than 7% by weight, and more preferably about 0.1-2.5% by weight.

In order to achieve the desired level of moisture content in lignocellulose substrate 1, substrate 1 is transported by conveyor system 2 to dehydration station 10 Substrate 1 is dried by heated air from first blower 11 and first heater 12 set between 200° F. and 300° F. The heated air exiting dehydration station 10 is diverted to second blower 51 for post-impregnation drying at station 50. Although a blower and heater combination is preferred in this embodiment, substrate 1 may alternatively be dried by a catalytic infra-red heater designed to achieve up to a 350° F. surface temperature on lignocellulosic substrate 1.

Next, dried lignocellulosic substrate 1 is impregnated with an isocyanate resin material at impregnation station 20. At impregnation station 20, isocyanate resin material is heated by resin heater 21 and transported by pump 22 from first reservoir 23 to a series of applicator nozzles 24, where the resin material is applied to, and impregnated into, dried substrate 1. Excess resin material is collected in first reservoir 23 below applicator nozzles 24 and subsequently reused. The reservoir and pumping system allows isocyanate resin material to be continuously reapplied to substrate 1, thus shortening the impregnation time and preventing waste of the isocyanate resin material. Isocyanate resin material is allowed to contact the surfaces of substrate 1 for preferably 4-10 minutes and, more preferably, for 4 minutes.

Instead of employing applicator nozzles 24, dried substrate 1 may alternatively be impregnated by soaking it in a soaking tank filled with heated resin material. If soaking is chosen for performing the impregnation step, lignocellulosic substrates 1 inside the soaking tank are preferably kept submerged for 4-10 minutes to insure full penetration of the isocyanate resin, but the actual soak time will depend upon the thickness and density of the substrate. The tank is preferably maintained at atmospheric pressure, but a pressurized soak tank may be used in order to shorten the soak time for thicker or denser substrates 1. When the tank is not in use, a dry inert gas at atmospheric pressure and room temperature is applied to the headspace to extend the resin's pot life.

Whether application by a series of nozzles or by soaking is chosen, the degree of impregnation of the isocyanate resin material into lignocellulosic substrate 1 is believed to be at least partly governed by the viscosity and temperature of the isocyanate resin material and the length of time and pressure at which the resin material is applied to substrate 1. For example, an isocyanate resin material having a lower viscosity or one being maintained at a higher temperature will be impregnated into substrate 1 more quickly than one having a higher viscosity or one being maintained at a lower temperature. Similarly, a higher pressure or longer application time will result in greater impregnation than a lower pressure or shorter application time. If MDI is chosen for the isocyanate resin material, viscosities for MDI products (in Centipoise) at various temperatures may be found in Table 1.

TABLE 1

Viscosity (in Centipoise) of Various MDI Products at Different Temperatures

| MDI Product | 25° C. (77° F.) | 50° C. (122° F.) | 60° C. (140° F.) |
|---|---|---|---|
| Lupranate M-20 S (BASF) | 200 | | 25 |
| Elastocast 7034 U (BASF) | 700 | 96 | 58 |
| WUC 3092 T (BASF) | 700 | 128 | |
| Desmodur VKS-18 (Bayer) | 150-250 | | |
| E-743 (Bayer) | 1700-3300 | | |
| X0672 (Bayer) | 300-800 | | |

During the impregnation step, the isocyanate resin material reacts with the wood cellulose. It is believed that the isocyanate forms a chemical bond between the hydroxyl groups of the wood cellulose, thus forming a urethane linkage. It is further believed that this chemical bond contributes to the improved strength of the final product. It is further believed that the isocyanate resin molecules, whether bonded to cellulose molecules or not, do not polymerize to any significant extent during the impregnation step.

The isocyanate resin material is preferably an MDI material. The structure of MDI is $O{=}C{=}N{-}Ph{-}CH_2{-}Ph{-}N{=}C{=}O$, where Ph is a phenyl group. More preferably, the isocyanate resin material contains 4,4'-methylene diphenyl diisocyanate.

Generally speaking, commercial preparations of the isocyanate resin material contain not only 4,4'-methylene diphenyl diisocyanate, but also poly(methylene diphenyl diisocyanate), otherwise known as polymeric MDI or PMDI, mixed methylene diphenyl diisocyanate isomers, and 2,4'-methylene diphenyl diisocyanate. If methylene diphenyl diisocyanate resin material is chosen for the isocyanate resin material, it preferably has a content of about 33% to about 49% of 4,4'-methylene diphenyl diisocyanate, less than about 70% of poly(methylene diphenyl diisocyanate), less than about 10% of mixed methylene diphenyl diisocyanate isomers, and less than about 8% of 2,4'-methylene diphenyl diisocyanate. Most preferably, the MDI employed in the invention will have about 45% methylene diphenyl diisocyanate, with the balance being poly(methylene diphenyl diisocyanate).

The MDI material should have high —N═C═O content, preferably an —N═C═O content of greater than 33% (by weight), more preferably 1%-33% (by weight), even more preferably 10%-33% (by weight), and most preferably 23%-32% (by weight). The MDI material will preferably have a high —N═C═O functionality, more preferably from 2 to 3, most preferably closer to 3 than 2. The MDI material will preferably have a viscosity of 50-300 Centipoise (at 25° C.), more preferably closer to 50 than 300. If desired, the MDI material may be used in combination with a non-polar solvent in a proportions of 10%-100% (by weight) of MDI and 0%-90% (by weight) of non-polar solvent. The isocyanate resin material may also include a preservative, such as a bactericide. fungicide or insecticide or the like. preferably in an amount of from 0.25%-10% (by weight) of the resin material. Examples of such biocides are complexes of boron, atrazines, thiazoles and carbamates. The isocyanate resin material may also include other additives such as fire or flame retardant chemicals, including but not limited to tris(1,3-dichloroisopropyl) phosphates, or dimethyl methalphosphenate. These fire or flame retardants may comprise from 0.25%-5.00% by weight of the resin material.

Next, at resin removal station 30, excess resin is removed from the surface of impregnated substrate 1 and the chemical reaction between the isocyanate and cellulose molecules is accelerated by an elevated temperature. In addition to resin removal at station 30, impregnated resin is also heated to the elevated temperature of 240-300° F. and forced toward the middle of substrate 1. The chemical reaction between the isocyanate resin and the cellulose molecules begins at temperatures as low as 212° F. At resin removal station 30, impregnated substrate 1 is passed by a first air knife set 32. At air knife set 32, heated air from heater 31 is directed onto surfaces of substrate 1 by blower 33. Air knife set 32 itself is a pair of long tubes each having a long slit for egress of heated air at an elevated pressure onto the surfaces of impregnated substrate 1. While the air flow, velocity and temperature through air knife set 32 may be varied, the air flow, velocity and temperature are preferably maintained at about 800 $ft^3$/min, about 15,000-35,000 ft/min, and about 240-300° F., respectively. As heated air impinges upon the surface of impregnated substrate 1 from air knife 32, some of the excess resin not fully impregnated into substrate 1 is forced further into substrate 1, while the remainder is blown off, thereby preventing a film or skin of resin material from forming on substrate 1's surface.

Next, the impregnated isocyanate resin material is polymerized at polymerization station 40 by applying a liquid to impregnated substrate 1 at a temperature sufficient for polymerization of the isocyanate material. The liquid is contained in second reservoir 41, where it is heated by heater 42, pumped by pump 43, and applied to impregnated substrate 1 by applicator nozzles 44. Surfaces of the impregnated substrate will cure to a darker appearance if they are not covered with the heated liquid, so it is preferable to ensure full coverage of all the surfaces with the heated liquid. The flow of liquid through nozzles 44 is preferably maintained at about 5-10 gallons/min at a pressure of 5-6 psi. After flowing off the surfaces of impregnated substrate 1, the heated liquid is collected in second reservoir 41 where it may be reused. Suitable liquids include those materials that exist in a liquid form (under atmospheric pressure) at the polymerization temperature of the isocyanate resin material and which also do not substantially inhibit the polymerization reaction. The liquid is preferably reactive toward the isocyanate resin material, thus forming reaction products at the surface of substrate 1. The liquid is selected so that the reaction products between it and the resin may be more easily removed from the surface of substrate 1, than compared to polymerized isocyanate resin at the surface of substrate 1. For example, if water and MDI are selected as the liquid and isocyanate resin, they react to form water soluble materials containing urea linkages. Because the reaction products formed at the surface of substrate 1 are soluble in the liquid, the resultant appearance of the treated surface of substrate 1 is that of a smooth, satin-like and relatively non-glossy board. A preferred liquid is water. The liquid may be maintained at a temperature of equal to or greater than 180° F., preferably at between 180° F. and 212° F., and most preferably at about 180° F. The liquid may be applied to impregnated substrate 1 for a period of 8-10 minutes. but shorter or longer times may be selected depending upon the thickness of lignocellulosic substrate 1.

Reaction products may result from a reaction between the heated liquid and the isocyanate resin material and will gradually build up in second reservoir 41 along with fibers from lignocellulosic substrate 1. As the reaction product builds up, it may be removed by filtering the liquid in second reservoir 41. Hot liquid make-up source 45 supplies fresh liquid to second reservoir 41 to replace liquid diminished through evaporation and filtration. Alternatively, the resin in impregnated substrate 1 may be polymerized by soaking impregnated substrate 1 in heated liquid inside a soaking tank equipped with a circulation pump and a heater.

Next, excess liquid is removed from polyisocyanate-impregnated substrate 1 at liquid removal station 50. This is accomplished by the use of a second air knife set 52 (also including heater 53 and blower 51) maintained at the same air flow and temperature as the first air knife set 32. As heated air impinges upon the surface of substrate 1 from air knife 52, excess liquid and any resin-liquid reaction product formed at the surface of substrate 1 is blown off substrate 1. Alternatively, the liquid removal step may be performed by merely removing polyisocyanate-impregnated substrate 1 from the liquid and allowing the liquid to drain. In yet another alternative, polyisocyanate-impregnated substrate 1 may be dried for about 10 minutes in an oven set at 200° F.-300° F. In any case, a moisture content of less than 10% is preferred.

Figure 2:
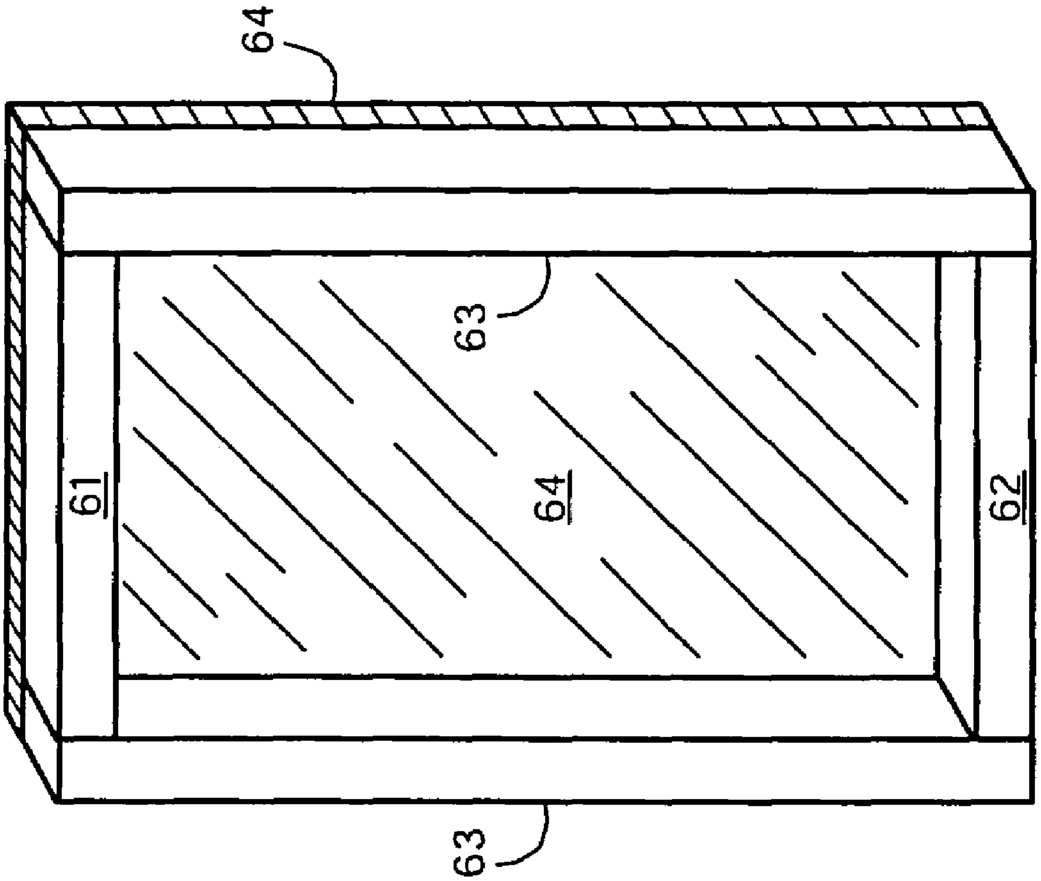
FIG. 2 is a perspective view of a door, with one door skin removed, in accordance with the present invention.

As shown in FIG. 2, the inventive door has a top rail 61, a bottom rail 62, and two stiles 63 forming a door frame, as well as two door skins 64 disposed on opposite sides of the door frame (one door skin has been removed to clarify the door's structure). It is understood that the door skins do not have to be planar, but may be formed according to any three-dimensional molded shape.

The inventive article's increased strength is believed to be due to some or all of the following factors: a) urethane linkages between —OH groups on the cellulose molecules of the lignocellulose fibers and —N═C═O groups on the isocyanate resin; b) urea linkages formed by the reaction of water bound in the lignocellulose fibers and —N═C═O groups of the excess isocyanate resin; c) a polyurethane chain formed by polymerization of the isocyanate resin; d) a polyurea chain formed by polymerization of the reaction product of bound water and excess isocyanate resin; e) encapsulation of lignocellulose fibers by the polyurea chains as described in above; f) encapsulation of lignocellulose fibers by the polyrethane chain formed by polymerization of the isocyanate resin; and g) cross-linking of the polyisocyanate chains.

The polyisocyanate-impregnated substrate of the present invention ordinarily will contain 0.5%-20%, preferably 2%-15%, more preferably 5%-10%, and most preferably 7%-8% polyisocyanate by weight.

EXAMPLES

The performance of six different PMDI formulas was compared by treating door skin and door rail/stile material with PMDI. The PMDI formulas are available under the following trade names: Lupranate M20S (BASF); Elastocast 7034U (BASF); WUC 3092 T (BASF); Desmodur VKS-18 (Bayer); E-743 (Bayer); and X0672 (Bayer).

Each of the formulas is a blend of the following ingredients: 33%-49% of 4,4' diphenylmethane diisocyanate, less than 70% of polymeric MDI, less than 10% of mixed isomers of MDI, and less than 8% of 2,4' diphenylmethane diisocyanate. The illustrative formulas have properties in the following ranges: a specific gravity of 1.08-1.24 (g/cm$^3$ at 25° C.), a density of 9.0-10.3 lbs/gal), a viscosity of 200-3300 (Centipoise at 25° C.), an NCO content of 23%-31.5% (by weight), and a functionality of 2.7.

The door skin and door rail/stile materials were treated as follows. The door stile/rail material was one-inch thick, 44 pound medium density fiberboard manufactured by Temple. Test samples labeled "B" were cut into pieces 6 inches long by 1-½ inches wide. Test samples labeled "A" were machined to a shape suitable for metal door applications and then cut to 6 inch lengths. The cross section of samples "A" was ⅞ inches by 1 inch. A pilot hole having a 0.120 inch diameter was drilled through each piece of the door stile/rail material. A 100% impregnation was not expected of the door stile/rail material. The predrilled pilot hole provides a means to extend the PMDI treatment into the screw holding area of the stile. The benefit of the predrilled pilot hole may be seen in Table 2.

The door skin material was high density fiberboard manufactured by Fibramold of Chile. The door skin material is labeled as samples "C" and "D." The door skin material was 0.125 inches thick and cut to 3-¾ inch by 5-¾ inch samples.

Each PMDI formula was used to impregnate a pair of the door skin pieces and a pair of the door rail/stile pieces. The pieces were submerged for ten minutes while the PMDI formulas were maintained at a temperature of 150° F. After impregnation, the pieces were heated for 10 minutes in a 200° F. oven and the excess PMDI wiped off. The pieces were then stored at room temperature for 18 hours. After storage, the pieces were again weighed, and cured by submerging them in 180° F. water for 10 minutes. After drying the pieces for 10 minutes in a 200° F. oven (to reduce the moisture content to less then 10% by weight), they were again weighed.

The PMDI Uptake value (in grams of PMDI per gram of fiberboard) was obtained by dividing the weight of MDI impregnated into the test sample by the weight of the untreated test example, and multiplying by 100%. The results are tabulated in Table 2.

The ability of a substrate in accordance with the invention to hold wood screws was then tested against a comparative sample, CE-1. Comparative sample CE-1 is a medium density fiberboard available under the trade name Medite FR (manufactured by Medex). Medite FR is a fire-rated fiberboard advertised by Medex as "the world's finest exterior grade formaldehyde-free MDF."

A pair ¾ inch #8 wood screws were then screwed into the door rail/stile material test examples (1A, 1B, 2A, 2B, etc.). One of the wood screws was screwed into the pilot hole while the other screw was screwed into an area other than the pilot hole. A single ¾ inch #8 wood screw was inserted into comparative sample CE-1.

Dimensional expansion due to water absorption was also tested for in test example 1B (door stile/rail material impregnated with Lupranate M20S) and comparative sample CE-1. As such, the initial dimensions (width, length and thickness) of test example 1B and comparative sample CE-1, as well as the weight of CE-1 were recorded.

Comparative sample CE-1 and all of the door rail/stile material test examples (1A, 1B, 2A, 2B, etc.) were then placed in boiling water for one hour and their weights recorded.

The percent water gain (in grams) for each test sample and comparative sample CE-1 was calculated by dividing the weight of water gained by the samples due to the boil by the weight of the sample before the boil, and multiplying by 100%. The results are tabulated in Table 2.

All of the test samples and comparative sample CE-1 were then dried in a 200° F. oven for 18 hours. The dimensions of test sample 1B and comparative sample CE-1 were recorded again. Each of the wood screws was removed, and the force (in psi) required to remove it was recorded. The results are tabulated in Table 2.

The percent expansion for each of length, width, and thickness was calculated by dividing the change in the particular dimension (whether after the change after boiling, or the change after both boiling and drying) by the initial dimension and multiplying by 100%. The results are tabulated in Tables 3 and 4.

TABLE 2

Percent Water Gain, Screw Pull Force, and PMDI Uptake

| Isocyanate Resin Formula | Example No. | % Water Gain | Screw Pull Force, Predrilled (psi) | Screw Pull Force, Not Predrilled (psi) | PMDI Uptake (g/g) |
|---|---|---|---|---|---|
| Lupranate | 1A | 3.01 | 507.0 | 310.1 | 0.169 |
| | 1B | 1.58 | 689.5 | 324.5 | 0.138 |
| | 1D | | | | 0.155 |
| Elastocast | 2A | 2.6 | 567.8 | 331.2 | 0.169 |
| | 2B | 1.7 | 703.0 | 351.5 | 0.146 |
| | 2C | | | | 0.134 |
| WUC 3092T | 3A | 4.45 | 527.3 | 358.3 | 0.148 |
| | 3B | 2.76 | 594.9 | 338.0 | 0.111 |
| | 3C | | | | 0.133 |
| DESMODUR | 4A | 3.41 | 561.1 | 358.3 | 0.161 |
| | 4B | 2.12 | 500.2 | 365.1 | 0.135 |
| | 4C | | | | 0.149 |
| E-743 | 5A | 4.15 | 405.6 | 324.5 | 0.108 |
| | 5B | 3.07 | 432.6 | 311.0 | 0.072 |
| | 5C | | | | 0.090 |
| X-0672 | 6A | 3.06 | 419.1 | 324.5 | 0.126 |
| | 6B | 2.29 | 554.3 | 297.4 | 0.090 |
| | 6C | | | | 0.130 |
| MEDEX MEDITE FR | CE-1 | 32.7 | | 338.0 | |

TABLE 3

Dimensional Expansion of Test Sample 1B (Medium Density Fiberboard Impregnation with Lupranate M20S)

| Measure | Initial Value | Value, 1 Hr. Boil | % Change After Boil | Value, Dried | % Change After Boiling and Drying |
|---|---|---|---|---|---|
| Length (in) | 5.987 | 5.998 | +1.10 | 5.980 | −0.12 |
| Width Predried (in) | 1.505 | 1.505 | 0.00 | 1.505 | 0.00 |
| Width Wet (in) | 1.505 | 1.514 | +0.60 | 1.505 | 0.00 |

TABLE 3-continued

| Dimensional Expansion of Test Sample 1B (Medium Density Fiberboard Impregnation with Lupranate M20S) | | | | | |
|---|---|---|---|---|---|
| Measure | Initial Value | Value, 1 Hr. Boil | % Change After Boil | Value, Dried | % Change After Boiling and Drying |
| Thickness Predried (in) | 1.005 | 1.014 | +0.90 | 0.995 | −0.40 |
| Thickness Wet (in) | 1.010 | 1.072 | +6.14 | 1.025 | +1.49 |
| Visual Assessment | | Excellent, no deformation | | | |

TABLE 4

| Dimensional Expansion of Comparative Sample CE-1 (Medex Medit FR Fiberboard) | | | | | |
|---|---|---|---|---|---|
| Measure | Initial Value | Value, 1 Hr. Boil | % Change After Boil | Value, Dried | % Change After Boiling and Drying |
| Length (in) | 5.976 | 6.015 | +0.65 | 5.960 | −0.27 |
| Width Predried (in) | 1.523 | 1.535 | +0.79 | 1.520 | −0.20 |
| Width Wet (in) | 1.529 | 1.550 | +1.37 | 1.527 | −0.13 |
| Thickness Predried (in) | 0.756 | 0.880 | +15.03 | 0.807 | +5.49 |
| Thickness Wet (in) | 0.757 | 0.950 | +25.50 | 0.874 | +15.46 |
| Visual Assessment | | Poor: edges swollen and center cupped | | Poor: cracked and cupped | |

Further water absorption properties were evaluated for the invention (test example 7) and two comparative examples CE-2 and CE-3. Test example 7 utilized medium density fiberboard as the substrate material. Masonite fiberboard was employed for comparative example CE-2, while Medex Medite FR fiberboard was used for comparative example CE-3. Test example 7 was impregnated with PMDI, dried, stored, cured and dried again as described above for test examples 1A through 6D. The weight, length and thickness of test example 7 and comparative examples CE-2 and CE-3 were recorded. Test example 7 and comparative examples CE-2 and CE-3 were then submerged in water for 24 hours. The weight, length and thickness were again recorded after submerging. The percent water absorption was calculated by dividing the change in weight due to the 24 hour soak by the initial weight. Similarly, the percent thickness swell was calculated by dividing the change in thickness due to the 24 hour soak by the initial thickness, and the percent linear expansion was calculated by dividing the change in length due to the 24 hour soak by the initial length. The results of the percentage water absorption, percentage thickness swell and percentage linear expansion are tabulated in Table 5.

TABLE 5

| Percent Water Absorption, Thickness Swell, and Linear Expansion | | | |
|---|---|---|---|
| | CE-2 (Masonite) | CE-3 (Medex Medite FR) | Test Sample 7 (MDF treated with PMDI) |
| % Water Absorption | 15 | 52 | 12 |
| % Thickness Swell | 15 | 20 | 11 |
| % Linear Expansion | 1.4 | 0.8 | 0.2 |

A thermal decomposition test was performed as well (test example 8). As in the water absorption test, test example 8 utilized medium density fiberboard. Comparative example CE-4 was a Masonite fiberboard, and comparative example CE-5 was a Medex Medit FR fiberboard. Test example 7B and comparative examples CE-4 and CE-5 were exposed to a temperature of 950° F. and observations were made at 3.5 minutes, 15 minutes and 30 minutes. The results are tabulated in Table 6.

TABLE 6

| Thermal Decomposition Test | | | |
|---|---|---|---|
| | CE-4 (Masonite) | CE-5 (Medex Medite FR) | Test Sample 8 (MDF treated with PMDI) |
| Appearance at 3.5 min. | − | + | + |
| Appearance at 15 min. | | − | + |
| Appearance at 30 min. | | | = |

+ Indicates the absence of visible red embers at edges and ply separation.
= Indicates the presence of visible red embers at edges, but no ply separation.
− Indicates either the presence of visible red embers at edges or ply separation with the surface layers broken into small curved segments.

The invention was further tested for both insect and fungi resistance. Portions of medium density fiberboard were treated with PMDI in accordance with the invention to provide test examples 9 and 10. Test example 9, along with comparative examples CE-6 of white pine and CE-7 of untreated MDF, were exposed to subterranean termites and powder post beetles. Test example 10 and comparative examples CE-8 of white pine and CE-9 of untreated MDF were exposed to brown-rot decay and white-rot decay. In all instances, test examples 9 and 10 performed as well as, or better than, both white pine and untreated MDF.

While this invention has been described as having a preferred design, it is understood that it is capable of further modifications, uses, and/or adaptations following in general the principle of the invention and including such departures from the present disclosure as come within known or customary practice in the art to which the invention pertains, and as may be applied to the essential features set forth herein, and fall within the scope of the invention limited by the appended claims.

What is claimed is:

1. A building article having a smooth, low-gloss surface prepared by:

(1) impregnating a preformed substrate of lignocellulosic material with an isocyanate resin material;

(2) removing excess isocyanate resin from the impregnated substrate of lignocellulosic material by impinging air at a high flow rate upon the impregnated substrate of lignocellulosic material;

(3) polymerizing the resin by applying water to the impregnated substrate of lignocellulosic material, the water being at a temperature sufficient for polymerization; and (4) removing the water from the polymerized resin-impregnated substrate of lignocellulosic material.

2. The building article of claim 1, wherein the impregnated substrate of lignocellulosic material is substantially non-conductive.

3. The building article of claim 1, wherein the preformed substrate of lignocellulosic material comprises material selected from the group consisting of medium density fiberboard, high density fiberboard, oriented strand board, particle board, hemp, sisal, cotton stalk, wheat, straw, bamboo, jute, salt water reeds, palm fronds, flax, groundnut shells, hard woods and soft woods.

4. The building article of claim 1, wherein the building article comprises a veneer, a sheet, a panel, a building component, a door component, a subfloor component, a roofing substrate component, a soffit component, a building component adapted for marine construction, a fence component, a recreational equipment component, a component of a sign, or a furniture component.

5. An article comprising a preformed substrate of lignocellulosic material, the preformed substrate being impregnated with a polyisocyanate material after formation, wherein the impregnated lignocellulosic substrate comprises a smooth, low-gloss surface.

6. The article of claim 5, wherein said impregnated lignocellulosic substrate is substantially non-conductive.

7. The article of claim 5, wherein the impregnated lignocellulosic substrate further exhibits increased strength over an un-impregnated lignocellulosic substrate.

8. The article of claim 5, wherein the impregnated lignocellulosic substrate further exhibits an increased resistance to water over an un-impregnated lignocellulosic substrate.

9. The article of claim 5, wherein the lignocellulosic substrate comprises material selected from the group consisting of medium density fiberboard, high density fiberboard, oriented strand board, particle board, hemp, sisal, cotton stalk, wheat, straw, bamboo, jute, salt water reeds, palm fronds, flax, groundnut shells, hard woods and soft woods.

10. The article of claim 5, wherein the polyisocyanate material comprises methylene diphenyl diisocyanate or poly (methylene diphenyl diisocyanate).

11. The article of claim 5, wherein the polyisocyanate material comprises polyisocyanate resin.

12. The article of claim 5, wherein the lignocellulosic substrate comprises a veneer, a sheet, a panel, a building component, a door component, a subfloor component, a roofing substrate component, a soffit component, a building component adapted for marine construction, a fence component, a recreational equipment component, a component of a sign, or a furniture component.

13. An article, comprising:

a preformed lignocellulosic substrate having a surface, the surface being treated with a polyisocyanate material such that the preformed substrate is impregnated with the polyisocyanate, wherein the impregnation is achieved by the polyisocyanate material being impinged into the preformed substrate.

14. The article of claim 13, wherein the treatment and impregnation of the preformed substrate with the polyisocyanate material is achieved by the polyisocyanate material being impinged upon the surface of the substrate with a nozzle applying the polyisocyanate material.

15. The article of claim 13, wherein the treatment of the preformed substrate with the polyisocyanate material is achieved by the preformed substrate being soaked in the polyisocyanate material.

16. The article of claim 13, wherein the impregnation of the preformed substrate with the polyisocyanate material is achieved by air being impinged upon the surface of the preformed substrate treated with the polyisocyanate material.

17. The article of claim 13, wherein excess polyisocyanate material on the surface of the preformed substrate is removed by air being impinged upon the surface of the preformed substrate after treatment with the polyisocyanate material.

18. The article of claim 13, wherein the surface of the preformed substrate after impregnation with the polyisocyanate material is polymerized with water.

19. The article of claim 13, wherein the surface of the preformed substrate after impregnation with the polyisocyanate material is smooth and low-gloss.

20. The article of claim 13, wherein the preformed substrate of lignocellulosic material comprises material selected from the group consisting of medium density fiberboard, high density fiberboard, oriented strand board, particle board, hemp, sisal, cotton stalk, wheat, straw, bamboo, jute, salt water reeds, palm fronds, flax, groundnut shells, hard woods and soft woods.

21. The article of claim 13, wherein the article comprises a veneer, a sheet, a panel, a building component, a door component, a subfloor component, a roofing substrate component, a soffit component, a building component adapted for marine construction, a fence component, a recreational equipment component, a component of a sign, or a furniture component.

22. The article of claim 13, wherein the preformed substrate comprises a moisture content that is less than approximately 7% by weight after the substrate is dried and before the preformed substrate is treated with the polyisocyanate material.

23. The article of claim 13, wherein the preformed substrate comprises a binder binding the lignocellulosic material of the substrate.

24. The article of claim 23, wherein the binder is selected from the group consisting of a urea-formaldehyde resin, a phenol-formaldehyde resin, and a polyurea resin.

25. The article of claim 13, wherein the preformed substrate comprises medium density fiberboard, and wherein the polyisocyanate material comprises poly(methylene diphenyl diisocyanate).

26. The article of claim 25, wherein the impregnated substrate has a first water absorption value that is less than or equal to approximately 80% of a second water absorption value of a comparable substrate without impregnation.

27. The article of claim 25, wherein the impregnated substrate has a first water absorption value that is less than or equal to approximately 23% of a second water absorption value of a comparable substrate without impregnation.

28. The article of claim 25, wherein the impregnated substrate has a first water absorption value that is less than or equal to approximately 14% of a second water absorption value of a comparable substrate without impregnation.

* * * * *